(12) United States Patent
Huang et al.

(10) Patent No.: US 7,705,958 B2
(45) Date of Patent: Apr. 27, 2010

(54) METHOD FOR MANUFACTURING LCD PANEL COMPRISING SPACERS HAVING CAVITY FILLED WITH ADHESIVE

(75) Inventors: Tai-Chi Huang, Tao Yuan Shien (TW); Yeong-Feng Wang, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 514 days.

(21) Appl. No.: 11/634,867

(22) Filed: Dec. 7, 2006

(65) Prior Publication Data
US 2007/0222934 A1    Sep. 27, 2007

(30) Foreign Application Priority Data
Mar. 24, 2006    (TW)  ............................. 95110354 A

(51) Int. Cl.
*G02F 1/1339*    (2006.01)
(52) U.S. Cl. .................. 349/155; 349/122; 349/187; 349/106
(58) Field of Classification Search .......... 349/155, 349/156, 187, 153, 158, 106, 122
See application file for complete search history.

(56) References Cited

U.S. PATENT DOCUMENTS

| | | | |
|---|---|---|---|
| 6,266,121 B1 * | 7/2001 | Shigeta et al. .............. 349/156 |
| 6,339,461 B1 * | 1/2002 | Kashiwazaki et al. ....... 349/155 |
| 6,515,790 B2 | 2/2003 | Miyamoto et al. .......... 359/296 |
| 6,583,846 B1 * | 6/2003 | Yanagawa et al. ........... 349/155 |
| 7,259,819 B2 * | 8/2007 | Yamaguchi et al. ......... 349/130 |
| 2002/0075443 A1 | 6/2002 | Shimizu et al. ............. 349/155 |
| 2004/0090429 A1 | 5/2004 | Geaghan et al. ............. 345/173 |
| 2005/0157245 A1 * | 7/2005 | Lin et al. .................... 349/155 |

FOREIGN PATENT DOCUMENTS

| TW | 237140 | 8/2005 |
|---|---|---|
| TW | 247959 | 1/2006 |
| TW | 261702 | 9/2006 |

* cited by examiner

*Primary Examiner*—Thoi V Duong
(74) *Attorney, Agent, or Firm*—Bacon & Thomas, PLLC

(57) ABSTRACT

A method for manufacturing a liquid crystal display device is disclosed. The method includes the steps of: forming multiple spacers having a cavity on the upper substrate or on the lower substrate; injecting adhesives or binders in the cavities of the spacers; and curing the adhesives or the binders in the cavities to bind the upper substrate and the lower substrate. Through the method illustrated above, the strength for combining these two substrates can be enhanced. Moreover, the uniformity of the gap inside the LCD panel, and the gravity mura resulted from the gravity can be improved. Therefore, the lifetime of the LCD can be extended.

20 Claims, 4 Drawing Sheets

METHOD FOR MANUFACTURING LCD PANEL COMPRISING SPACERS HAVING CAVITY FILLED WITH ADHESIVE

BACKGROUND OF THE INVENTION

1. Field of the Invention

The present invention relates to a method for fabricating a panel of a flat panel display device, and more particularly, to a panel of a liquid crystal display device.

2. Description of Related Art

Currently, most of the present liquid crystal displays (LCDs) are laid on the desks or hooked on the walls vertically. However, when the liquid crystal filled in a panel of the LCD is heated by the external heat source (e.g., illumination of the backlight module), the liquid crystal are apt to flow toward the bottom side of the vertical LCD because of the thermal expansion and gravity. Hence, the flow of the liquid crystal results in the expansion of the gap between the two substrates of the panel, and further causes the non-uniform distribution of the gap and the color. Moreover, even modern manufacturing process cannot produce a panel with identical heights of spacers in the panel. The amount of the dropped liquid crystal filled in the panel cannot be controlled. Therefore, the mura, especially on the bottom side of the panel of the vertical LCD, cannot be avoided. In addition, the problem illustrated above may become serious as the large-sized panel is produced in future.

In addition to the deterioration of the display quality, the problem illustrated above also shortens the lifetime of the LCD by distorting the bottom side of the panel. Therefore, the heights of the spacers applied in the lower half portion of the vertical conventional LCD panel is longer than that of the upper half portion of the same LCD panel. In other words, the gap of the lower half portion of the vertical conventional LCD panel is larger than that of the upper portion of the vertical conventional LCD panel. By way of the arrangement illustrated above, the distortion of the liquid crystal swelled by heat can be well moderated. However, since the gap is not the same, the display quality is not good. On the other hand, an LCD panel with both scattered spacers and photo spacers are also suggested to solve the illustrated problem. The scattered spacers are expected to solve the non-uniform distribution of colors (mura). Unfortunately, the scattered spacers facilitate light leakage and further reduce the contrast of the images. Furthermore, the scattered spacers are also easy to aggregate and scratch the surface of the substrate. Some researchers suggested divide each pixel independently to make the liquid crystal not flow smoothly. Therefore, the pressure difference between the upper half portion and the lower half portion can be reduced. However, the diffusion of the liquid crystal become poor and further causes other problems in the subsequent manufacturing process.

Therefore, it is desirable to provide an improved method to mitigate the aforementioned problems.

SUMMARY OF THE INVENTION

The liquid crystal display panel according to the present invention uses photo sensitive adhesives or thermal curing adhesives to promote the connection of the upper substrate and lower substrate in the panel, keep the height of the cell space of the panel the same, and also, avoid the poor distribution of the colors.

The present invention provides a method for manufacturing a liquid crystal display panel, which comprises the following steps: providing a upper substrate and a lower substrate; forming a plurality of spacers on the upper substrate or on the lower substrate, wherein each of the spacers has at least a cavity; filling the cavity with an adhesive; and curing the adhesive and assemble the upper substrate and the lower substrate.

The sequence of the step of filling the liquid crystal material in the method of the present invention is not limited. Preferably, after curing the adhesive and sealing the periphery of the upper substrate and the lower substrate, the filling of the liquid crystal between the upper substrate and the lower substrate is achieved; or the filling of the liquid crystal is achieved by dropping the liquid crystal on the lower substrate before curing the adhesives and sealing the upper substrate and the lower substrate. The sequence of the step of curing the adhesive and sealing the upper substrate and the lower substrate is not limited in the method of the present invention. Preferably, the adhesive is cured first, and then the upper substrate and the lower substrate are sealed with glue, or sealing and the curing are completed at the same time.

Furthermore, the formation of the spacer of the present invention in the panel is not limited. In one objective of the present invention, the spacers can be formed on the upper substrate or the lower substrate directly. In another objective of the present invention the spacers can be dispersed on the upper substrate or the lower substrate by using a spacer spraying system. In another objective of the present invention, the spacers of the present invention can be dispersed through both spraying and direct formation at the same time.

In one embodiment of the present invention, the photo spacers are formed on the upper substrate by way of stacking when the photoresist type color filter with different color is formed. In another embodiment of the present invention, the photo-spacers are formed on the substrate by photolithography directly in the method of the present invention.

In the method of the present invention, the formation of the cavity in the spacer of the present invention is not limited. Preferably, the cavity is formed through a photolithographic process. More preferably, the cavity is formed by a half-tone mask exposure process. In an embodiment, the spacers having cavities in the liquid crystal display panel of the present invention is formed through a half-tone mask exposure process formed on the substrate at the same time.

In addition, the adhesives mentioned above can be filled through any process or apparatus. Preferably, the adhesives are filled through ink-jet printing.

In addition, the adhesives can be cured through any curing process. The adequate curing process depends on the curing adhesives. In one of the embodiments of the present invention, the adhesives are cured through radiation. In another embodiment of the present invention, the adhesives are cured through heating. All the curing of the adhesives illustrated above is used to cure the adhesives between the upper substrate and the lower substrate. The applied adhesives of the present invention are not limited. Preferably, the adhesives of the present invention are photosensitive polymer, a laser sensitive polymer, a thermal curing polymer, or the combination thereof.

In one embodiment of the present invention, the adhesives are cured by the illumination of UV light, and the applied adhesive is a UV-curable polymer. In another embodiment of the present invention, the adhesives are laser sensitive polymer, and the adhesives are cured through a laser beam. In another embodiment of the present invention, the laser sensitive polymer is illuminated by a near IR laser.

The liquid crystal display device of the present invention includes: a upper substrate; a lower substrate; a plurality of spacers locating between the upper substrate and the lower substrate; and a liquid crystal layer located between the upper substrate and the lower substrate; wherein part of the spacers has cavities and adhesives filled in the cavities, and the adhesives in the cavities adhere the upper substrate and the lower substrate after curing.

The spacers of the liquid crystal display device can be laid or arranged in various locations on the upper substrate or the lower substrate according to the application demand of the liquid crystal display devices. The panel of the liquid crystal display device can have all spacers having cavities, or only part of the spacers are the spacers with cavities. Preferably, the spacers having cavities locate close to the border of the liquid crystal layer and to one side of the periphery of the panel of the lower substrate. In one embodiment of the present invention, the spacers having cavities are laid on the lower half part of the panel when the panel is arranged vertically or in a slant angle; and the other upper half part of the panel includes spacers without cavities.

The material of the spacers is not limited. Preferably, the spacers are made of photosensitive polymer, silica, polystyrene, or the combination thereof.

The shape of the spacers of the present invention is not limited. Preferably, the spacer is in a shape of a ball, a pole, a bump with different top area and bottom area, a cone, or the combination thereof. The shape of the cavity of the spacer is not limited. Preferably, the cavity of the spacers is a rectangular cavity, an egg-shaped cavity, a ball-shaped cavity, or the combination thereof. The size of the spacer is not limited, and the size of the spacer can be adjusted according to the real panel of the size of the panel The upper substrate of the present invention can selectively further include an alignment film and a transparent electrode. The lower substrate can selectively further comprise an alignment film, a color filter, a black matrix, a thin film transistor, and a transparent electrode. The arrangement of the elements illustrated above is not limited, especially not limited by the embodiment described below.

The black matrix can be formed on the upper substrate or the lower substrate. Basically, the formation of the black matrix will not interfere the radiation curing of the adhesives and the formation of the spacers. In an embodiment of the present invention, the black matrix is laid on the upper substrate, and the curing of the laser sensitive polymer adhesive is achieved by the illumination of the near IR light beam.

The panel with spacers having cavities can be used for any liquid crystal display device. Preferably, the panel with spacers having cavities is used for an active matrix thin film transistor liquid crystal display (AM TFT-LCD), an in-plane switching (IPS) LCD, or an optically compensated birefringence (OCB) LCD. In one embodiment of the present invention, the panel with spacers having cavities is applied for an LCD with chip-on-array (COA) techniques.

The cavities of the spacers of the panel of the present invention are filled with cured adhesives for combining the upper substrate and the lower substrate closely after the adhesives are cured. The spacers filled with curable adhesives in the cavities can be used for enhancing the combination of the two substrates closely in the high-pressure loading area of the LCD panel. Hence, the long-term distortion of the panel owing to the non-homogeneous distribution of the gap can be avoided, and the display quality can be improved.

Other objects, advantages, and novel features of the invention will become more apparent from the following detailed description when taken in conjunction with the accompanying drawings.

DETAILED DESCRIPTION OF THE EMBODIMENT

Embodiment 1

Figure 1:
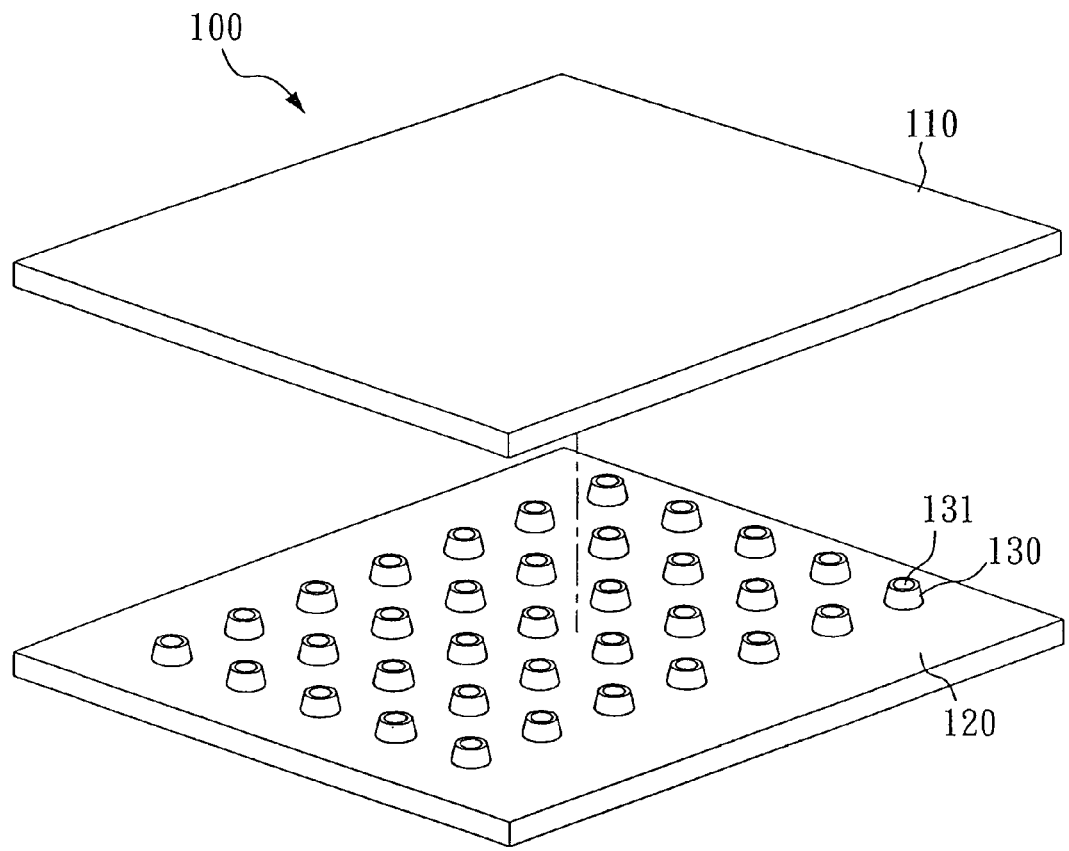
FIG. 1 is a perspective view of the LCD panel of one embodiment of the present invention.

With reference to FIG. 1, there is shown a perspective view of an exploded liquid crystal display panel 100 of the embodiment of the present invention. As shown in FIG. 1, the liquid crystal display panel 100 includes an upper substrate 110, a lower substrate 120, and a plurality of cylinder-shaped spacers 130 located on the upper substrate 110 or on the lower substrate 120. The spacers 130 of the present embodiment are made by photosensitive polymer, and each spacer 130 has a cavity 131 on the top surface thereof. In the cavity 131, a UV-curable adhesive is filled (not shown in FIG. 1). The UV-curable adhesive is used to adhere the upper substrate 110 and the lower substrate 120 after the UV-curable adhesive is cured.

Moreover, an alignment film made of polyimide, and a transparent electrode, for example, ITO, are also formed over the upper substrate 110. Likewise, an alignment film, color filters, a black matrix, thin film transistors, transparent electrodes, and a planarizing layer are also formed over the lower substrate 120 (see FIG. 2).

The arrangement of the elements in the LCD panel 100 can be adjusted according to the real demand of various panels. One example of the locations of these elements illustrated above can be seen in FIG. 2.

Figure 2:
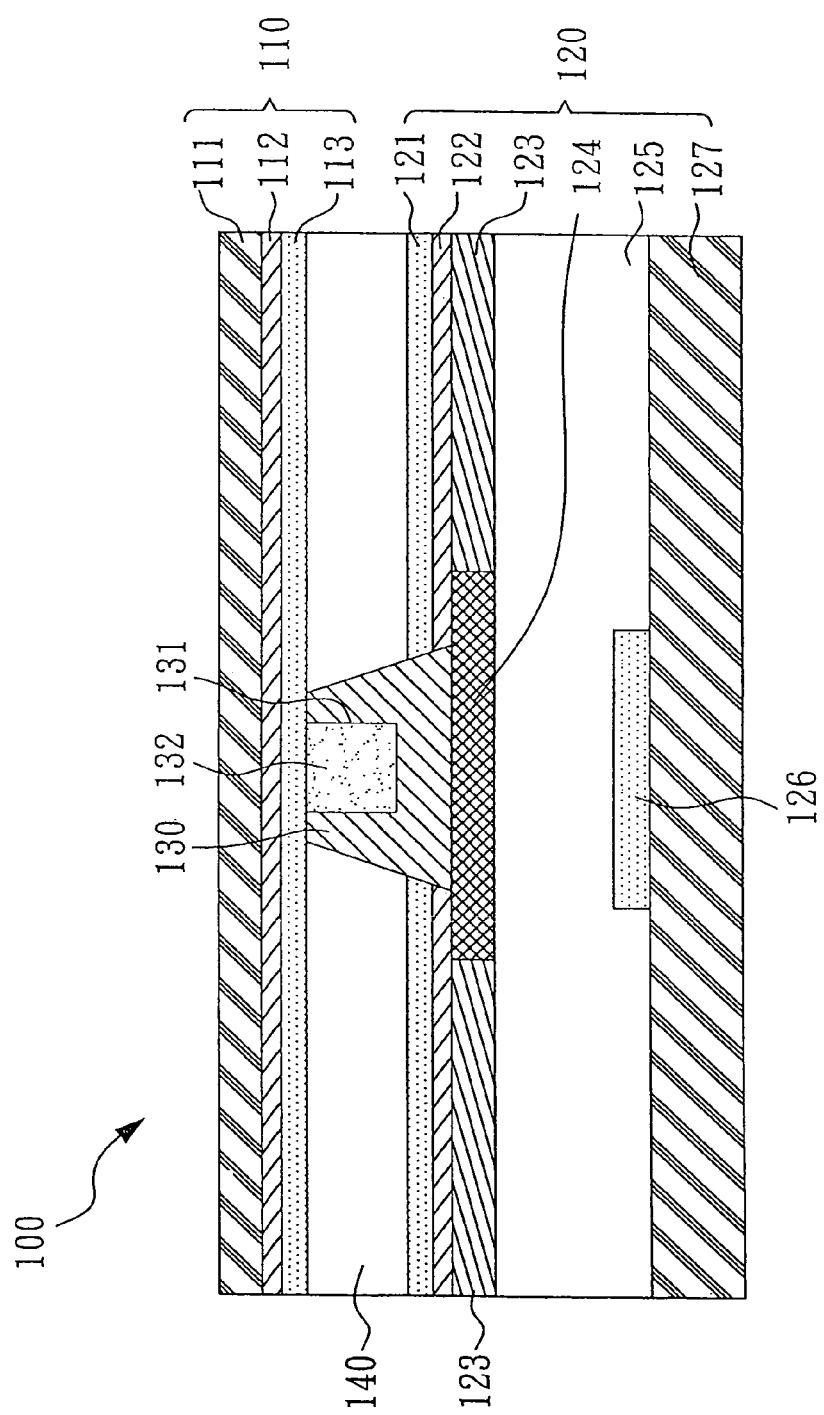
FIG. 2 is a cross-section view of the LCD panel of one embodiment of the present invention.

A cross-section view of a LCD panel 100 of one embodiment is shown in FIG. 2. As shown in FIG. 2, the LCD panel 100 includes an upper substrate 110, a lower substrate 120, a liquid crystal layer 140, and a plurality of cylindrical spacers having cavities 131 and filled with a UV-curable polymer 132. The upper substrate of the present embodiment includes a glass substrate 111, a transparent electrode (e.g., ITO) 112, and a polyimide alignment film 113. The lower substrate 120 of the present embodiment includes an alignment film 121 made of polyimide, a transparent electrode 122, a color filter 123, a black matrix 124, a planarizing layer 125, a thin film transistor 126, and a glass substrate 127 (see FIG. 2).

The LCD panel illustrated in the present embodiment is made by following steps. First, an upper substrate 110 and a lower substrate 120 are provided. Several spacers 130 having cavities 131 are formed on the lower substrate 120 by way of exposure under a half-tone mask. Then a binder (i.e., an adhesive) 132 of a UV-curable adhesive (or a UV-curable polymer) is filled into the cavities 131 of the spacers through ink-jet printing. The binder 132 is illuminated with a UV-light to cure the binder (i.e. the adhesive) 132 and adhered the upper substrate 110 and the lower substrate 120. In the present embodiment, the diameter of the formed cylindrical spacer is 20-30 μm, and the height of the cylindrical spacer is around 4-5 μm. Moreover, the diameter of the cavity of the spacer is 6-12 μm, and the depth of the cavity of the spacer of the present embodiment is 1-2 μm.

Subsequently, a sealant is applied on the periphery of the upper substrate 110 and the lower substrate 120 to form a closed inner space. The liquid crystal is then filled into the inner space sandwiched between the upper substrate 110 and the lower substrate, i.e., the inner space enveloped by the sealant. The assembling of the LCD panel is finally completed when the liquid crystal is filled and sealed in the inner space of the panel as illustrated above. Generally, when the binder (i.e., the adhesive) 132 is filled, the volume of the filled binder (i.e., the adhesive) is less than that of each cavity 131.

Embodiment 2

The LCD panel of the present embodiment is the same with that illustrated in embodiment 1 except the binders (i.e., the adhesives) are different. The binders (i.e., the adhesives) applied in the present embodiment are thermal curing polymers. The fabrication of the LCD panel of the present embodiment is identical to that of the embodiment 1 except the binder is cured through heating (e.g., thermal curing). The thermal curing polymers used in the present embodiment are epoxy resins.

Embodiment 3

The LCD panel of the present embodiment is the same with that illustrated in embodiment 1 except the binders (i.e., the adhesives) are different. The binders (i.e., the adhesives) applied in the present embodiment are laser sensitive polymers. The fabrication of the LCD panel of the present embodiment is identical to that of the embodiment 1 except the binder is cured through a laser beam (i.e., laser curing). The laser sensitive polymers used in the present embodiment are epoxy resins or acrylic polymers.

Embodiment 4

The LCD panel of the present embodiment is the same with that illustrated in embodiment 1 except the wavelength of the laser for curing binders (i.e., the adhesives) and the location of black matrix are different. The binders (i.e., the adhesives) applied in the present embodiment are also laser sensitive polymers. The fabrication of the LCD panel of the present embodiment is identical to that of the embodiment 1 except the laser beam for curing binder is in the field of near IR. Moreover, the location of the black matrix is different from that of the LCD panel described in embodiment 1. In the present embodiment, the black matrix is formed on the upper substrate. Therefore, the near IR beam can penetrate the substrate and cure the binders.

Embodiment 5

Figure 3:
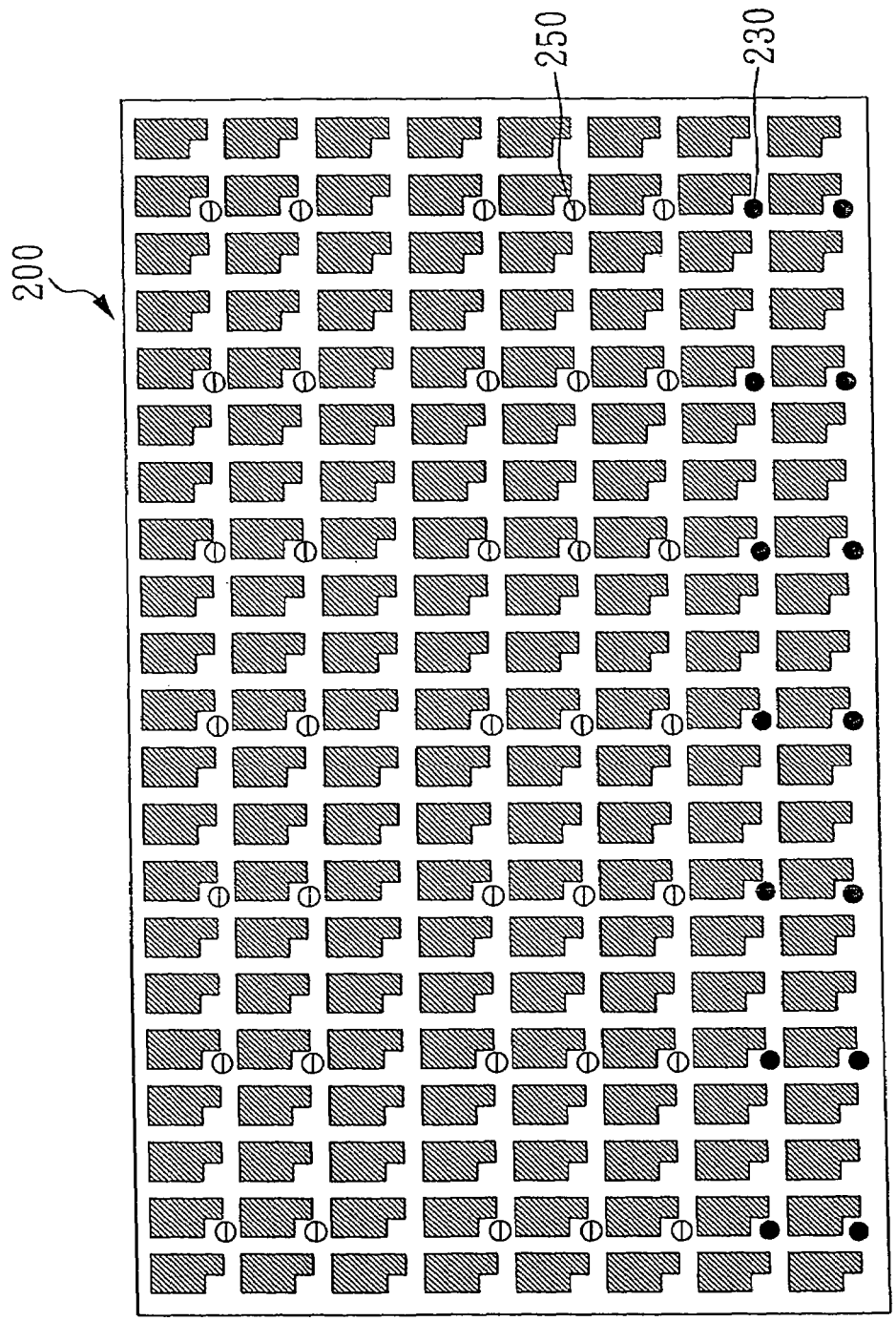
FIG. 3 is a schematic view of the LCD panel of another embodiment of the present invention.

With reference to FIG. 3, there is shown a schematic view of a liquid crystal display panel 200 of the embodiment of present invention. The LCD panel of the present embodiment includes several spacers 250 without cavities, and other spacers 230 with cavities. In the LCD panel of the present embodiment, the spacers 250 without cavities are formed in the upper half portion of the LCD panel when the LCD panel is arranged vertically or in a slant angle. On the other hand, the spacers 230 with cavities are formed in the lower half portion of the LCD panel when the LCD panel is arranged vertically or in a slant angle.

The spacers without cavities can be formed by any conventional forming method. In the present embodiment, the spacers 250 without cavities are laid by directly spraying the ball-shaped polystyrene spacers on the lower substrate through a spacer spray system.

Figure 4:
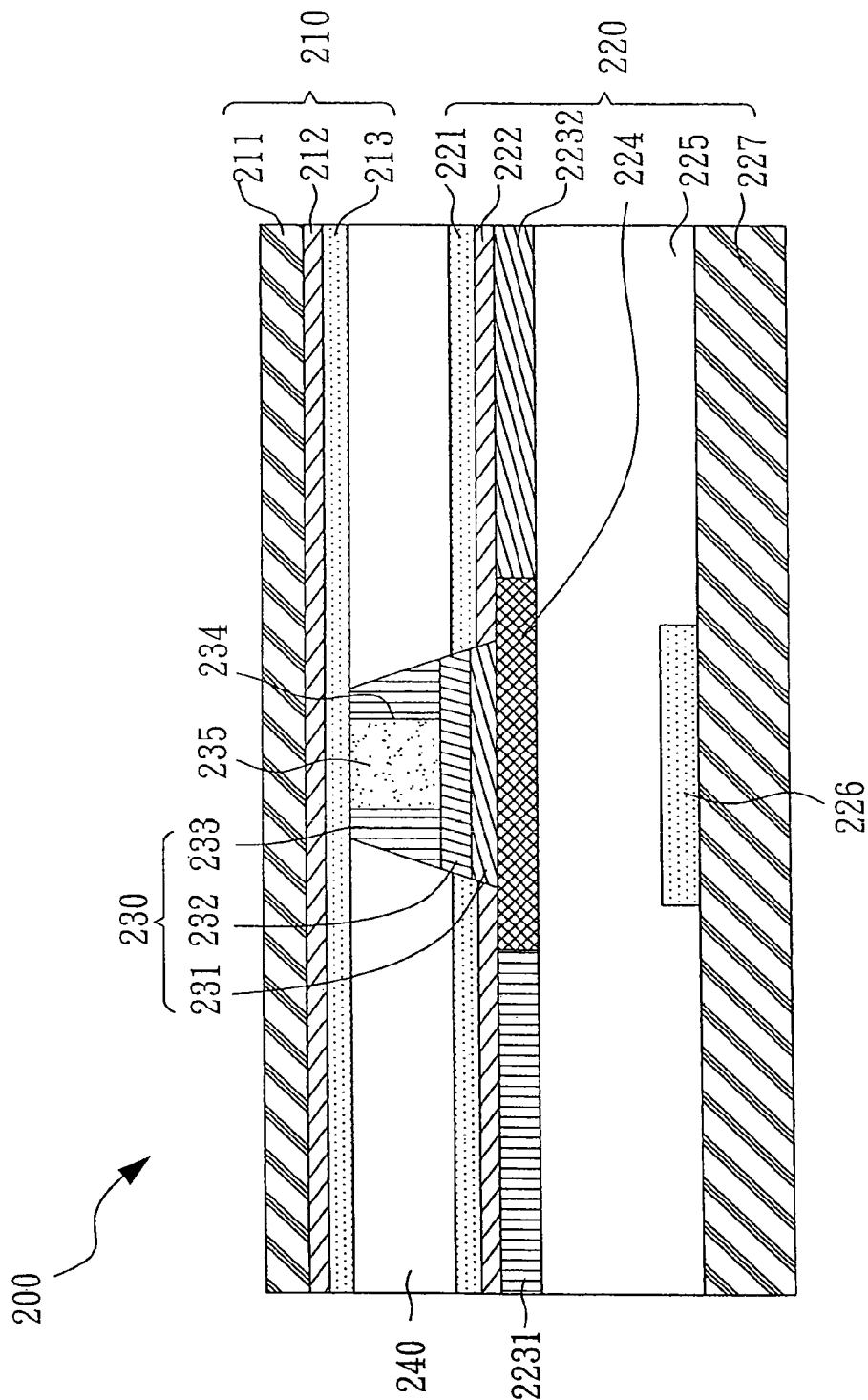
FIG. 4 is an enlarged cross-section view of one portion of the LCD panel of another embodiment of the present invention.

On the other hand, the spacers 230 having cavities are accumulated on the substrate through photolithography at the same time when color filter is formed (see FIG. 4).

FIG. 4 shows an enlarged cross section view of a portion of the LCD panel 200 shown in FIG. 3. The portion shown in FIG. 4 is the portion includes spacers 230 with cavities. As shown in FIG. 4, the portion of the LCD panel 200 includes an upper substrate 210, a lower substrate 200, a plurality of cylindrical spacers 230 with cavities 234 and binders (i.e., adhesives) 235, and a liquid crystal layer 240 locating between the upper substrate 210 and the lower substrate 220.

The binders (i.e., the adhesives) 235 are laser sensitive polymers, and are cured by laser beams. The upper substrate 210 of the present embodiment includes a glass substrate 211, a transparent electrode (e.g., ITO) 212, and a polyimide alignment film 213. The lower substrate 220 includes a polyimide alignment film 221, a transparent electrode 222, color filters 2232, 2231, a black matrix 224, a planarizing layer 225, a thin film transistor 226, and a glass substrate 227. The LCD panels of the present embodiment are made through similar processes for producing conventional LCD panels. However, the formation of the spacers 230 is performed at the same time that the color filter 2231, 2232 is formed. Actually, the spacers 230 accumulate on the surface of the lower substrate 220. The spacers 230 with the cavities 234 are defined or formed when the red color filter 231, the blue color filter 232, or the green color filter 233 is formed. The cavities 234 are formed through another photolithographic process after the spacers are formed.

The other element of the LCD panel 200 of the present embodiment is similar to the method for producing the LCD panel described in embodiment 1 except that the steps after the spacers 230, 250 are formed. In the present embodiment, the spacers 230, 250 are formed on the lower substrate 220. Then the periphery of the lower substrate 220 is sealed with a sealant. The liquid crystal 240 is filled on the lower substrate through ODF process, and the upper substrate 210 and the lower substrate 220 are assembled together. When the two substrates are combined together, the binders (i.e., the adhesives) are cured by radiation at the same time.

Since the cavities of the spacers of the present invention can be filled with curable binders or curable adhesives, the adhesion between the upper substrate and the lower substrate is enhanced. Hence, the distortion on the panels owing to poor distribution of pressure can be well improved. Therefore, the lifetime of the LCD panel can be extended and the display quality of the LCD panel can be improved.

Although the present invention has been explained in relation to its embodiment, it is to be understood that many other possible modifications and variations can be made without departing from the scope of the invention as hereinafter claimed.

What is claimed is:

1. A method for fabricating a panel of a liquid crystal display, comprising:
    providing an upper substrate and a lower substrate;
    forming a plurality of spacers between the upper substrate and the lower substrate, wherein each of the spacers has at least a cavity;

filling the cavity with an adhesive; and curing the adhesive to assemble the upper substrate and the lower substrate.

2. The method of claim 1, further comprising:

sealing the periphery of the upper substrate with a glue; and filling a liquid crystal composition between the combined and sealed space between the upper substrate and the lower substrate.

3. The method of claim 1, wherein the spacers are formed on the surface of the lower substrate.

4. The method of claim 1, wherein the spacers are formed through photolithography.

5. The method of claim 4, wherein the spacers are formed through a halftone process.

6. The method of claim 5, wherein the adhesive is cured through radiation of UV light, laser, or IR radiation.

7. The method of claim 1, wherein the adhesive is filled through ink-jet printing.

8. The method of claim 1, wherein the adhesive is cured through radiation.

9. The method of claim 1, wherein the adhesive is cured through heating.

10. A liquid crystal display panel, comprising:

an upper substrate;

a lower substrate;

a plurality of spacers between the upper substrate and the lower substrate; and a liquid crystal layer disposed between the upper substrate and the lower substrate;

wherein part of the spacers has cavities and adhesives filled in the cavities, and the adhesives in the cavities adhere to the upper substrate after curing.

11. The panel of claim 10, wherein the spacers having cavities are laid in the lower half pan of the panel when the panel is arranged vertically or in a slant angle.

12. The panel of claim 10, wherein the adhesive is a photosensitive polymer, a laser sensitive polymer, a thermal curing polymer, or combinations thereof.

13. The panel of claim 12, wherein the photosensitive polymer is a UV-curable polymer.

14. The panel of claim 10, wherein the plurality of spacers are made of a photosensitive polymer, silica, polystyrene, or combinations thereof.

15. The panel of claim 10, wherein the plurality of spacers are in a shape of a ball, a pole, a bump with different top area and bottom area, a cone, or combinations thereof.

16. The panel of claim 10, wherein the cavity of the spacers is a rectangular cavity, an egg-shaped cavity, a ball-shaped cavity, or combinations thereof.

17. The panel of claim 10, wherein the upper substrate comprises an alignment film, and a transparent electrode.

18. The panel of claim 10, wherein the lower substrate comprises an alignment film, a color filter, a black matrix, a thin film transistor, and a transparent electrode.

19. A liquid crystal display panel, comprising:

an upper substrate;

a lower substrate;

a plurality of spacers between the upper substrate and the lower substrate; and a liquid crystal layer disposed between the upper substrate and the lower substrate;

wherein part of the spacers has cavities and adhesives filled in the cavities.

20. The panel of claim 19, wherein the spacers are comprised of a red color filter, a blue color filter or a green color filter.

\* \* \* \* \*